June 23, 1936. J. SACHS Re. 20,018

AUTOMATIC CIRCUIT BREAKER

Original Filed April 21, 1928 2 Sheets-Sheet 1

Inventor
Joseph Sachs
By S. Jay Teller
Attorney

June 23, 1936. J. SACHS Re. 20,018

AUTOMATIC CIRCUIT BREAKER

Original Filed April 21, 1928 2 Sheets-Sheet 2

Inventor
Joseph Sachs
By S. Jay Teller
Attorney

Reissued June 23, 1936 Re. 20,018

UNITED STATES PATENT OFFICE 20,018

AUTOMATIC CIRCUIT BREAKER

Joseph Sachs, West Hartford, Conn.

Original No. 1,812,842, dated June 30, 1931, Serial No. 271,819, April 21, 1928. Application for reissue April 21, 1933, Serial No. 667,291

56 Claims. (Cl. 200—88)

The invention relates particularly to a circuit breaker which is adapted to be small and compact and which is capable of being manufactured at low cost so as to be suitable for use with small motors and household appliances and with service entrance installations. Such a circuit breaker particularly when used in service entrance installations, may take the place of the usual switch and fuses, and it affords the householder an opportunity of restoring the service himself, after it has been interrupted by an overload, without the necessity for the troublesome replacement of fuses.

It is ordinarily essential that a circuit breaker of this general class shall be "trip free", that is, adapted to be automatically operated or tripped independently of the handle so that the circuit breaker will not fail to operate even though the handle be held in closed-circuit position. One of the more general objects of the invention is to provide a circuit breaker of this type particularly adapted for the classes of service referred to and so constructed as to be simple and inexpensive but nevertheless reliable and efficient.

In accordance with prior practice the electro-responsive device of a circuit breaker, whether magnetic or thermal, has acted through interposed links, levers, or other mechanical contrivances to effect the release of the contact carrying member from the control of the handle or actuating member. These interposed connections have not only greatly added to the size and cost of the circuit breaker but they have rendered it less effective, particularly in the case of severe overloads or short circuits. These interposed mechanical connections have offered frictional resistance to movement, thus making the circuit breaker less sensitive than it otherwise would be; and by reason of their own inertia and by reason of lost motion in their inter-connections, they have required additional time for their operation, thus delaying the opening of the circuit. In the case of a short circuit, it is necessary, in order to avoid damage to the circuit breaker itself and to other connected apparatus, to break the circuit practically instantaneously. A delay of a very small fraction of a second permits the continued flow of dangerously heavy current, with resultant damage to the connected apparatus. When motion must be transmitted through successively acting mechanical connections, time is lost and the opening of the circuit is delayed.

In accordance with the present invention the delay in the opening of the circuit is very greatly reduced, and is in fact practically eliminated, by utilizing the electro-responsive means or at least the electro-responsive element thereof as a part of the mechanical connection between the actuating member and the contact member. Normally this element of the electro-responsive means serves as a mechanical connection whereby motion may be transmitted from the actuating member to the contact member; but upon the attainment of abnormal current conditions in the circuit the said element, by reason of its own electro-responsive characteristics, moves in such a way as to render the mechanical connection ineffective and to thereby permit the contact member to independently immediately move to its open-circuit position. This movement of the contact member takes place immediately upon the electro-responsive movement of the said element without any of the delay heretofore resulting from the transmission of motion through interposed mechanical connections.

A more specific object of the invention is to provide a circuit breaker of the type described wherein the means which normally prevents circuit opening movement includes or has associated therewith a bodily movable thermostatic bimetallic element serving in and of itself as a part of the mechanical connection between the actuating member and the contact member. This bimetallic element, by reason of its own inherent thermally responsive characteristics, is deflected or otherwise moved upon the attainment of abnormal current conditions in the circuit so as to thereby release the contact member for independent movement to open-circuit position. The use of the bi-metallic element as an essential part of the mechanical connection, makes it possible for such an element to be used as the electro-responsive means in classes of service where such an element has not heretofore been regarded as entirely satisfactory.

A further object of the invention is to provide a circuit breaker of the type described having improved toggle link mechanism for partly controlling the operation.

A still further object of the invention is to provide a novel structural arrangement of parts, including an insulating contact member carrying the movable contacts and stationary insulating walls associated therewith, which arrangement provides simplicity, compactness and the minimizing of arcing.

A still further object of the invention is to provide a circuit breaker of the type described having all of the parts carried by a compact simple supporting body adapted to be readily secured to or removed from the main insulating base, which base may be utilized to carry other electrical parts.

A still further object of the invention is to provide in a circuit breaker of the type described an improved body construction including spaced parallel plates upon which the other parts of the circuit breaker proper are supported.

While as already pointed out the use of the thermostatic bi-metallic element as a part of the connection between the actuating member and the contact member makes it possible to use such an element for classes of service wherein it would not otherwise be acceptable, it is nevertheless possible that for some special or unusual classes of service it may be necessary or at least desirable, to still further speed up the action. This may be done by combining with the thermostatic bimetallic strip a magnetic device which acts to accelerate the thermally responsive movement of the strip. A further object of the invention therefore is to provide a circuit breaker of the type described which includes two electro-responsive devices, one thermal and one magnetic, the two devices being arranged and connected in an improved manner so that either may serve to release the movable contact and open the circuit.

A still further object of the invention is to provide a circuit breaker of the type last above referred to wherein there is a complete circuit breaking unit which includes a thermally controlled element, the said unit being combined with a magnetic mechanism which may serve to release the contact of the said unit.

In the accompanying drawings I have shown two embodiments of the invention but it will be understood that the drawings are intended for illustrative purposes only and are not to be relied upon as limiting or defining the scope of the invention, the claims forming a part of this specification being relied upon for that purpose.

Figure 1:
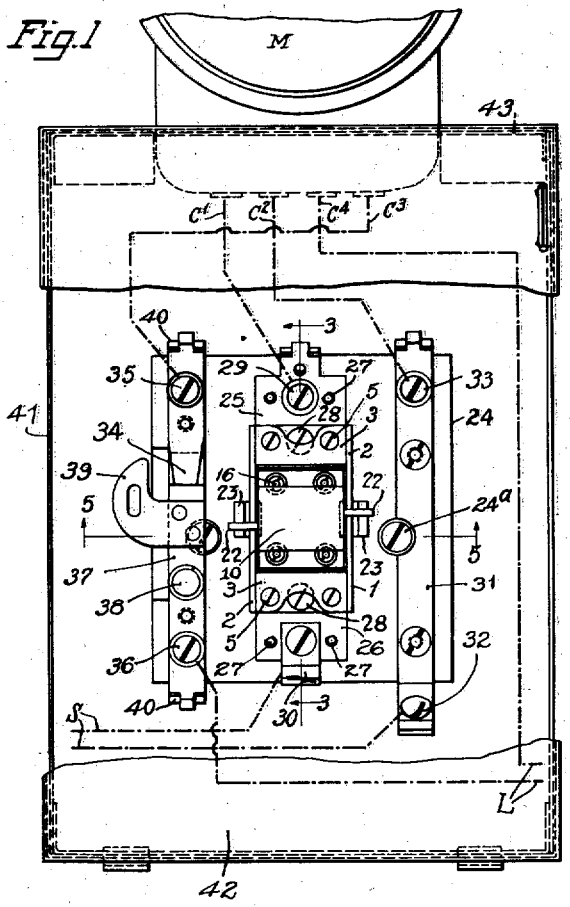
Fig. 1 is a front view of a circuit breaker embodying the invention, the said circuit breaker being shown as enclosed in a cabinet adapted to be protectively associated with an electric meter.

The circuit breaker proper may, if preferred, constitute a separate unit adapted to be combined or associated with other electrical parts and it will be so described.

Referring particularly to Figs. 1 to 6 of the drawings, 1 represents as an entirety the body portion of the circuit breaker unit. The body portion 1 as illustrated comprises two side plates 2, 2 and two cross bars 3, 3 all formed of insulating material. In addition the body comprises two transverse U-shaped metallic members 4, 4. In order that the various parts may be held together I have shown screws 5, 5 extending through the bars 3, 3 into the members 4, 4 and I have shown the said members 4, 4 as provided with integral extensions 6, 6 which extend through openings in the side plates 2, 2 and are riveted over. It will be observed that with the body constructed as described there is provided a central rectangular opening therein bounded at the sides by the plates 2, 2 and at the ends by the bars 3, 3 and the U-shaped members 4, 4.

I preferably provide a manually controllable actuating member for the circuit breaker. I do not narrowly limit myself as concerns the construction and movement of the actuating member but I have shown an actuating member or bar 7 which is movable rectilinearly forward and rearward and extends through the opening in the body. For supporting and guiding the actuating member or bar 7 I provide an additional transverse connecting member extending between the two side plates 2, 2. This additional member is in the form of a U-shaped yoke 8 which is provided with a central opening through which the mmeber or bar 7 is slidably movable. The legs of the yoke 8 extend rearward and engage the side plates 2, 2 being held in place by means of screws 9, 9. Connected with the actuating member or bar 7 at the front end thereof is an operating member or handle 10, this handle being connected by means of a transverse screw 11.

Carried by the body 1 of the circuit breaker unit is at least one relatively fixed electrical contact and preferably two such contacts. I have shown two contacts 12, 12 which project into the central opening of the unit at opposite sides thereof, being secured to the bottom flanges of the U-shaped members 4, 4 by means of rivets or screws 13, 13. The rear portions of the contact elements 12, 12 acting in conjunction with the corresponding rear portions of the U-shaped members 4, 4 serve as connectors adapted to be detachably engaged with suitable companion connectors on a main supporting base or panel such as will be described. The said connectors serve to effect not only mechanical connection, but also electrical connection as will presently appear.

The circuit breaker unit includes a movable contact member 14 which may be adapted to be moved in unison with the actuating member or bar 7. This contact member may advantageously be mounted directly upon and carried by the actuating member and it is so shown. When the actuating member is movable rectilinearly the contact member is preferably also movable rectilinearly. As shown the contact member 14 is in the form of an insulating block provided with a central aperture through which the actuating member or bar 7 extends. The said block 14 is adapted to slide longitudinally of the actuating member being guided in part thereby and in part by the legs of the U-shaped yoke 8. Carried by the block 14 is at least one and preferably two movable contacts 15, 15 these being positioned to respectively engage the fixed contacts 12, 12 when the block 14 is in its normal or rearmost position. The contacts are held in place by means of screws 16, 16 provided with nuts 16a, 16a.

In conjunction with the said contact member I provide an electro-responsive means which comprises an element bodily movable with the said member and constituting at least a part of a normally operative mechanical connection preventing automatic circuit opening movement.

When there is an actuating member such as 7 the said bodily movable element normally makes it possible for the actuating member to effect the operation of the contact member. The said element is so constructed and so related to other parts that it is inherently responsive to abnormal current conditions in the circuit, ordinarily excess current; and by reason of an electro-responsive effect acting directly thereon, the said element is movable relatively to the member which supports it. This relative electro-responsive movement serves to render ineffective the mechanical connection, and when the mechanical connection becomes ineffective the contact member is permitted to automatically move in the circuit opening direction independently of the actuating member. In the preferred form of the invention, not only one element of the electro-responsive means is bodily movable with the actuating and contact members, but the entire electro-responsive means is so movable.

As concerns the broader aspects of my invention I do not limit myself to an electro-responsive means of any one type, but I prefer an electro-responsive means of the type wherein the electro-responsive action is a thermal one. The electro-responsive means which is shown in the drawings is a bi-metallic thermal element or strip 17 which is carried by the contact member 14 and preferably is electrically connected between the contacts 15, 15.

When so connected, the strip 17 is adapted to be deflected by reason of the heating action of excess current therein in accordance with the well known action of such bi-metallic strips. Upon being so deflected it serves to release the contact member to permit the said member and also the strip to move automatically to open-circuit position. The strip 17 is substantially U-shaped as shown and it projects through the central opening in the block 14, being held in place by the nuts 16a, 16a on the said screws 16, 16. The strip 17 is separated by portions of the insulating block or contact member 14 from the positions of engagement and disengagement of the respective contacts 12, 12 and 15, 15. The rear transverse portion of the strip 17 extends through a slot 18 in the actuating member or bar 7 and when the strip 17 is at normal temperature the said transverse rear portion thereof is engaged in a notch 19 in the said actuating member or bar 7.

Thus the strip 17 preferably serves in and of itself as a latch for releasably connecting the contact member and the actuating member. Preferably there is a small reinforcement 17a carried by the thermal strip 17 and constituting a part of the latch, this reinforcement being located at the point where the strip enters the notch 19.

Figure 4:
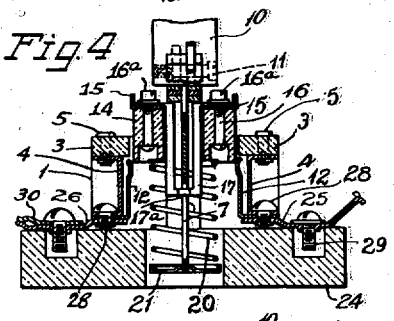
Fig. 4 is a vertical sectional view taken along the said line 3—3 of Fig. 1, but showing the parts in the positions to which they are moved automatically when an overload occurs.
Figure 5:
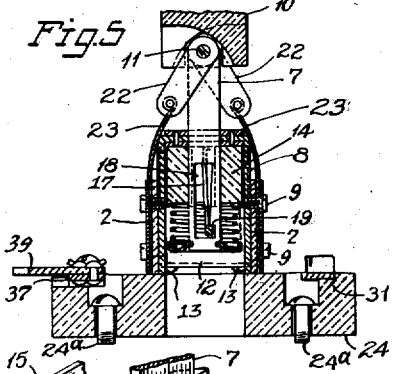
Fig. 5 is a horizontal sectional view taken along the line 5—5 of Fig. 1, but showing the parts in the positions to which they are moved manually for breaking the circuit.
Figure 6:
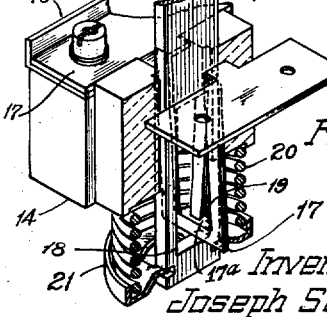
Fig. 6 is an enlarged fragmentary perspective view showing the cooperative relationship of certain parts.

It will be noted particularly from an inspection of Figs. 4 and 6 that the end portions of the bi-metallic strip 17 are electrically connected with and preferably directly engage the respective metallic pieces which form the movable contacts 15, 15. The thermal strip is held in such engagement by means of the nuts 16a, 16a on the screws 16, 16 and it will therefore be obvious that the thermal strip may be readily removed for adjustment or replacement without removing the contacts themselves from the contact member or block 14 upon which they are carried.

The contact member or block 14 with the movable contacts 15, 15 thereon is biased relatively to the actuating member for movement toward its open-circuit position, in this case toward its forward position. Preferably, the biasing of the contact member is effected by means of a spring and this spring may advantageously be operatively interposed between the movable actuating member and the movable contact member.

As shown a spring 20 is interposed between the contact member 14 and the rear end of the actuating member 7. I have shown a coil spring which surrounds the actuating member, the said spring directly abutting at its front end against the said member 14 and abutting at its rear end against a washer 21 carried by the actuating member at the rear end thereof. The washer 21 may have openings therein as shown. The spring 20 tends to move the contact member forward with respect to the actuating member, such forward movement, however, being normally prevented by reason of the engagement of the strip 17 in the notch 19 as already described.

Figure 7:
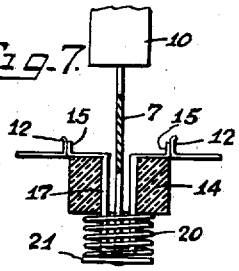
Figs. 7 to 9 are diagrams showing the principle of operation.
Figure 8:
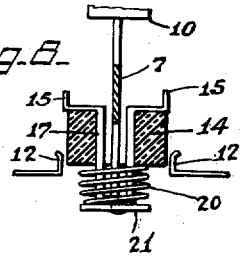
Figure 9:
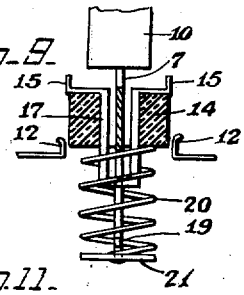
Figure 10:
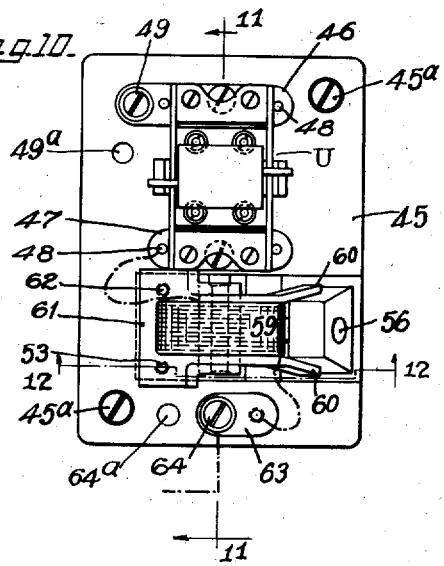
Fig. 10 is a front view showing an alternate embodiment of the invention, the cover being omitted.
Figure 11:
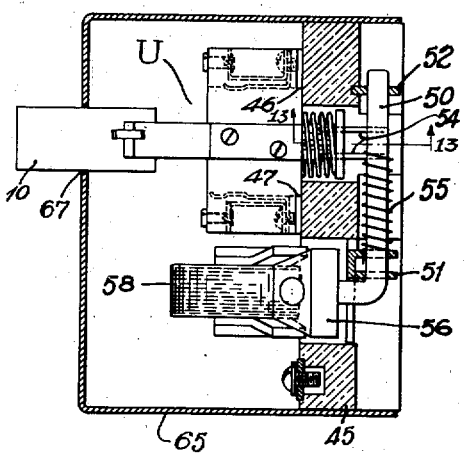
Fig. 11 is a vertical sectional view taken along the line 11—11 of Fig. 10.
Figure 13:
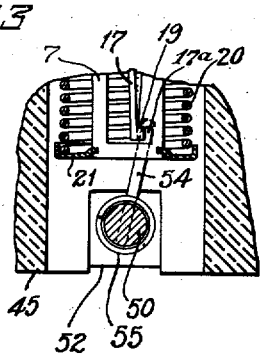
Fig. 13 is an enlarged fragmentary horizontal sectional view taken along the line 13—13 of Fig. 11.
Figure 12:
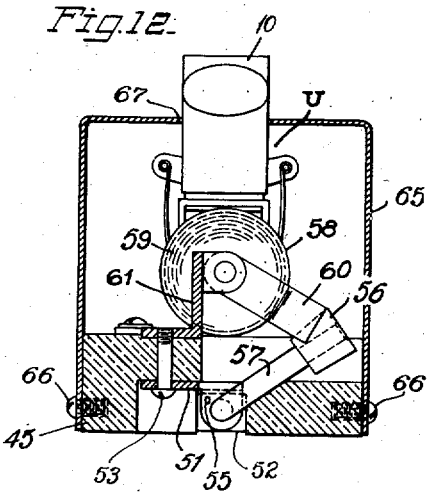
Fig. 12 is a horizontal sectional view taken along the line 12—12 of Fig. 10.

Figs. 7, 8 and 9 are diagrammatic figures showing the operation of the device. Fig. 7 shows the parts in the normal position with the circuit closed; Fig. 8 shows the parts in the position to which they are moved when the circuit is opened manually; and Fig. 9 shows the parts in the position to which they are moved when the circuit is opened automatically.

Figure 3:
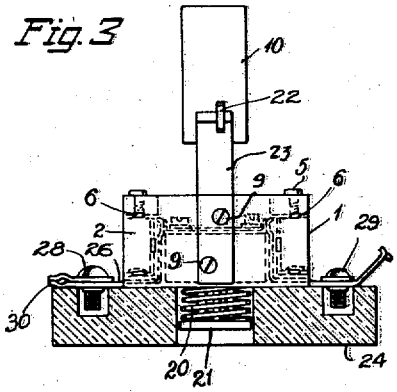
Fig. 3 is a side view partly in section along the line 3—3 of Fig. 1, the enclosing cabinet being omitted.
Figure 2:
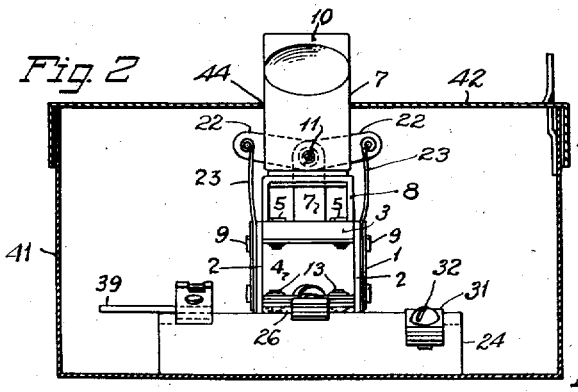
Fig. 2 is a bottom view of the circuit breaker shown in Fig. 1, the enclosing cabinet being shown in transverse section.

From the foregoing description, and particularly by reference to Figs. 7 and 8, it will be seen that the entire assembly comprising the actuating member or bar 7, the handle 10 and the contact block 14 together with the immediately associated parts may be moved bodily forward or rearward by means of the said handle 10. With the parts in the rear position as shown in Figs. 2, 3 and 7 the contacts 15, 15 are in engagement with the contacts 12, 12, a circuit being thus established which includes the said thermostatic element 17. The circuit may be broken by moving the aforesaid assembly bodily forward to the positions shown in Fig. 8 thus disengaging the contacts 15, 15 from the contacts 12, 12. It will be observed that the circuit is broken at two places thus minimizing any arcing tendency. The stationary insulating cross bars 3, 3 provide walls which are immediately adjacent the paths of circuit-opening movement of the contacts 15, 15, thus further minimizing arcing. The transverse portion of the yoke 8 serves as a stop to limit the movement in both directions.

As stated the normal circuit through the device includes the bi-metallic strip 17. This strip is so constructed and so mounted that upon the passage of a current therethrough in excess of a predetermined amount it will be deflected toward the left as viewed in Fig. 6. The strip is so constructed and adjusted that when the current exceeds the said predetermined amount the said strip 17 will disengage the shoulder at the front end of the notch 19 thus breaking the mechanical connection between the contact block 14 and the actuating member or bar 7. As soon as this mechanical connection is broken the contact block is immediately forced forward under the action of the spring 20 and the circuit is immediately broken at two places as shown in Fig. 9.

After the circuit has once been broken by the action of the spring 20 as already described it may be re-established by first pulling the operating member or handle 10 and the actuating member or bar 7 forward sufficiently to permit the strip 17 to again enter the notch 17. The parts are then in the positions shown in Fig. 8. With the strip thus entered in the notch the circuit may be closed in the usual way by pushing the entire assembly rearward as already described. It will be clear that if the excess current conditions still prevail upon the attempted reclosure of the circuit, the thermostatic strip 17 will again act as already described to break the mechanical connection between the contact member and the actuating member and thus cause the reopening of the circuit.

In addition to the spring, such as the spring 20, which serves to bias the contact member for movement to its open-circuit position I preferably provide a second spring means which is adapted and positioned to act upon the actuating member independently of the contact member to move both of the members to their open-circuit positions when they are connected with each other in the normal manner. When such an additional spring is provided it is obviously necessary to provide a means, preferably manually releasable, adapted to hold the actuating member in its closed-circuit position and to prevent movement thereof by the said second spring except when the circuit is to be manually opened.

As illustrated the additional spring means comprises two leaf springs 23, 23 which are rigidly mounted at their rear ends on the body of the device. Preferably, and as shown, the springs 23, 23 are held by the same screws 9, 9 which have already been referred to. The springs 23, 23 are mechanically connected with the actuating member 7 and with the handle 10 by means of toggle links 22, 22. The links 22, 22 extend through slots in the rear portion of the handle 10 and are pivotally mounted at their inner ends on the aforesaid screw 11. The said links are pivotally mounted at their inner ends on the aforesaid screw 11. The said links are pivotally connected at their outer ends with the said leaf springs 23, 23.

It will be observed that, when the central pivotal axis of the toggle links at 11 is in front of a line connecting the end pivotal axes, the springs 23, 23 will act to move the actuating member and handle and also the contact member in the forward direction to their open-circuit positions. It will also be observed that, when the pivotal axis at 11 is behind the said line connecting the end axes, the said toggle links 22, 22 serve as a means for holding the actuating member and handle in their rear closed-circuit positions. Although the toggle links thus serve to hold the actuating member and handle in their rear positions it will be observed that the said parts are releasably held, being adapted to be moved forward manually at any time. The toggle links and springs serve not only to hold the movable switch parts in their "on" positions or in their "off" positions but in addition they serve to effect a quick-make-and-break action inasmuch as the springs augment the manual action, making it much more speedy than would otherwise be the case.

The circuit breaker unit which I have described may be used in association with any desired parts and I do not limit myself to any one use thereof. However, in order that one application of the invention may be clearly understood I have shown the said unit combined with other parts to form a house entrance installation adapted to be directly associated with an electric meter M. I do not herein broadly claim the use of an automatic circuit breaker mechanism as a part of a meter service installation this being set forth and claimed in my patent for Electric service installation No. 1,696,150 dated December 18, 1928.

I have shown the circuit breaker unit as mounted on a base 24 of insulating material. The said base is provided with conducting plates 25 and 26 which are held in place on the base by means of screws 27, 27 extending forward from the rear thereof. The said plates 25 and 26 constitute connectors adapted to be engaged by the aforesaid connectors at the rear of the circuit breaker unit. The circuit breaker unit proper is held in place with the respective connectors in engagement by means of screws 28, 28 which extend through holes in the lower flanges of the members 4, 4 and into threaded holes in the said plates 25 and 26. The said plates 25 and 26 are further provided with means such as the screw 29 and the clamp 30 for engagement with electric conductor wires. In order that complete provision may be made for the connection and use of an electric meter I provide on the base 24 in addition to the circuit breaker unit a neutral conconductor or strap 31 provided with wire terminals 32 and 33 and a test switch 34 interposed between wire terminals 35 and 36. The details of the test switch 34 may be varied but I have shown a switch comprising a blade 37 pivoted at 38 and adapted to be swung laterally by means of an insulating handle 39. In order to further facilitate the testing of the meter suitable contacts adapted for the attachment of instrument leads and by-pass connections are provided at 40, 40.

One arrangement of electrical connection which may be used is shown by dot-and-dash lines in Fig. 1. The service wires S are connected respectively with the terminals 30 and 32. Meter connections $C^1$ and $C^2$ extend respectively from the terminals 29 and 33 to the meter and other meter connections $C^3$ and $C^4$ extend respectively from the meter to the terminal 35 and to one of the load wires L. The remaining load wire L is connected with the remaining terminal 36.

From the foregoing description it will be apparent that the circuit breaker unit is interposed between an incoming service wire and the meter and thus serves to protect not only the customer's load circuit but also the meter in case of any excess current conditions. The circuit from the meter extends through the test switch 34 and this switch may therefore be utilized to disconnect the meter from the load wires for testing in accordance with well understood practice. Prior to the opening of the switch 34 a suitable by-pass may be connected to the proper contacts 40, 40 in order that the customer's circuit may not be interrupted.

The base 24 and the parts carried thereby may be enclosed in a protecting cabinet such as the cabinet 41. This cabinet is or may be of substantially standard construction being rectangular in form and having an openable front cover 42 adapted to be sealed in closed position to protect the interior parts. The base 24 may be secured to the rear wall of the cabinet by means of screws 24ᵃ, 24ᵃ. Preferably the upper end wall 43 of the cabinet is provided with a suitable opening through which the terminal chamber portion of the meter may project as shown so as to entirely enclose the connections between the meter and the service appliance within the cabinet. The front cover 42 of the cabinet is provided with an opening 44 through which the handle 10 projects. It will be seen that this arrangement permits the customer to operate the circuit breaker without obtaining access to the interior of the cabinet. By means of the operating member or handle 10 the customer can operate the circuit breaker to open and close the circuit for normal switching purposes or he can operate it to close the circuit after it has been automatically opened as the result of an overload.

In Figs. 10 to 13 I have shown another embodiment of the invention including a circuit breaker unit which is or may be exactly the same in construction as that already fully described. The circuit breaker unit is designated as an entirety by U, and it may be understood to be identical in construction with the unit heretofore described. An insulating base 45 is provided with carrying plates 46, 47 held in place by means of screws 48, 48 extending from the back of the base. The plate 46 is provided with a screw 49 adapted to serve as a wire terminal.

I provide in association with the circuit breaker mechanism, already described, a means supplemental thereto for mechanically effecting the operation thereof, the said supplemental means being electrically controlled preferably magnetically and being fixed against bodily movement with the contact member. The said supplemental means may be mounted on the same base 45 which supports the circuit breaker unit U and I have so shown it in the drawings. I do not herein broadly claim a circuit breaker adapted to operate by the combined or alternative electro-thermal and electro-magnetic effects of the current, as this subject matter is set forth and claimed in my patent for Automatic circuit breaker, No. 1,736,372 issued November 19, 1929.

As illustrated the base 45 carries a rock shaft 50 which is located directly behind the circuit breaker unit and extends perpendicularly to the axis thereof. The shaft 50 is supported by suitable bearing members 51 and 52 the former being held in place by a screw 53 and the latter being molded in place in the material of the base. The rock shaft carries at least one and preferably two pins 54, 54 which normally project through an opening in the washer 21 and are located in close proximity to the lower portion of the bi-metallic strip 17. Associated with the shaft 50 is a spring 55 which tends to rotate the shaft in the clockwise direction as viewed in Figs. 9 and 10, that is, in the direction to move the pins 54, 54 away from the bi-metallic strip 17. Carried by the shaft 50 near one end thereof is a member 56 adapted to serve as a magnetic armature. As shown the shaft 50 has a right angle bend near its lower end, the member 56 being carried by the angularly extending portion 57.

Carried by the base 45 is an electro-magnet 58 comprising a coil 59 and pole pieces 60, 60 connected with a suitable core. The magnet is supported by a bracket 61 of non-magnetic material held in place by the aforesaid screw 53 and another screw 62. One end of the wire forming the coil 59 is connected with the terminal plate 47 and the other end is connected with a terminal plate 63 secured to the base 45 and provided with a screw 64 forming a main wire terminal. The incoming and outgoing wires are connected respectively with the terminals 64 and 49 and thus the magnet 58 and the circuit breaker unit U are connected in series with each other.

Upon the passage of excess current the bi-metallic strip 17 of the circuit breaker unit tends to act in the way already described to effect the opening of the circuit. However, inasmuch as the magnet 58 is in series with the circuit breaker unit the said magnet is simultaneously energized tending to draw the armature 56 upward between the pole pieces 60, 60. Movement of the armature 56 rocks the shaft 50 in the counter-clockwise direction thus moving the pins 54, 54 against the bi-metallic strip 17 so as to mechanically move it and release it from the actuating member 7.

When the circuit breaker unit U is to be used alone as shown in Figs. 1 to 6, the thermostatic bi-metallic element thereof may be so designed and proportioned as to act very quickly in the case of a heavy overload or a short circuit. However, when a magnet is provided in conjunction with the unit U as shown in Figs. 10 to 13, the thermostatic bi-metallic element may be designed and proportioned to act somewhat more slowly, and in this case the parts are so constructed and adjusted in relation to each other that a moderate overload will cause the bi-metallic strip 17 to deflect and effect the opening of the circuit as already described, without energizing the magnet sufficiently to enable it to be effective. However, in the case of an excessive overload such as might be caused by a short circuit the magnet will be instantly energized thus rocking the shaft 50 and releasing the strip 17 from the operating member by direct mechanical engagement therewith. In the case of an excessive overload the magnet would act more quickly than the bi-metallic strip and thus the circuit would be interrupted more quickly than it would by means of the normal action of the bi-metallic strip.

The construction as shown in Figs. 7 to 10 may be enclosed by means of a suitable cover if desired, such a cover being shown at 65. The cover 65 is held in place by means of screws 66, 66 projecting into holes in the base 45. The cover 65 is provided with an opening 67 for the handle 10. Screws 45ᵃ, 45ᵃ may be provided for mounting the entire device on a wall or panel. Wires may extend from the rear through the wall or panel and through holes 64ᵃ and 49ᵃ in the base into engagement with the terminals 64 and 49.

What I claim is:

1. An automatic circuit breaker comprising in combination, a movable contact member biased toward its open-circuit position, a movable actuating member normally adapted to move the contact member to open or close the circuit, and an electro-responsive means comprising an element inherently responsive to abnormal current conditions in the circuit and constituting at least a part of a mechanical connection between the said actuating and contact members normally operative to prevent independent circuit opening movement of the latter, the said element upon the attainment of an abnormal current condition in the circuit being relatively movable by reason of its own inherent electro-responsive characteristics so as to render the said mechanical connection ineffective and to thereby permit the contact member to move to its open-circuit position independently of the actuating member.

2. An automatic circuit breaker as set forth in claim 1, wherein the electro-responsively movable element is a latch carried by one of the said members and normally having a direct engagement with the other, the said latch being automatically disengaged from the said other member upon the attainment of an abnormal circuit condition so as to permit independent movement of the contact member.

3. An automatic circuit breaker as set forth in claim 1, wherein the entire electro-responsive means is bodily movable with the said actuating and contact members.

4. An automatic circuit breaker as set forth in claim 1, wherein there are two separate circuit breaking contacts on the contact member and wherein the entire electro-responsive means is bodily movable with the said member and is electrically connected between the said contacts.

5. An automatic circuit breaker as set forth in claim 1, wherein the actuating and contact members are normally movable in fixed relationship with each other and wherein the entire electro-responsive means is bodily movable with the said actuating and contact members.

6. An automatic circuit breaker comprising in combination, a movable contact member biased toward its open-circuit position, a movable actuating member normally adapted to move the contact member to open or close the circuit, and an electro-responsive means comprising a thermally-responsive element normally movable with the said actuating and contact members and constituting at least a part of a mechanical connection between them normally operative to prevent independent circuit opening movement of the contact member, the said element upon the attainment of an abnormal current condition in the circuit and as the result of its own thermally-responsive characteristics being movable relatively to the said actuating and contact members so as to render the said mechanical connection ineffective and to thereby permit the contact member to move to its open-circuit position independently of the actuating member.

7. An automatic circuit breaker as set forth in claim 6, wherein the thermally-responsive element is a latch carried by one of the said members and normally having a direct engagement with the other, the said latch being automatically disengaged from the said other element upon the attainment of an abnormal current condition.

8. An automatic circuit breaker as set forth in claim 6, wherein the contact member is carried by and is normally movable in unison with the actuating member, and wherein the thermally-responsive element is a latch carried by one of the said members and normally having a direct engagement with the other, the said latch being automatically disengaged from the said other element upon the attainment of an abnormal current condition.

9. An automatic circuit breaker comprising in combination, a movable actuating member, a movable contact member biased toward its open-circuit position, and an electro-thermally affected element serving in and of itself as a releasable latch normally movable with the actuating and contact members and normally operative for mechanically connecting them to enable the former to effect the movement of the latter to open or close the circuit, the said electro-thermally affected latch being connected in the circuit so as to be automatically actuated upon the passage of excess current therethrough to mechanically disconnect the contact member from the actuating member and thus permit the said contact member to automatically move to its open-circuit position independently of the actuating member.

10. An automatic circuit breaker as set forth in claim 9, wherein the electro-thermal latch is carried by the contact member and is movable therewith independently of the actuating member.

11. An automatic circuit breaker comprising in combination, a movable contact member biased toward its open-circuit position, a movable actuating member normally adapted to move the contact member to open or close the circuit, and a thermostatic bi-metallic strip serving in and of itself as a releasable latch normally movable with the actuating and contact members and normally operative for mechanically connecting them to enable the former to effect the movement of the latter, the said thermostatic bi-metallic latch being connected in the circuit so as to be automatically deflected from its normal position upon the attainment of an abnormal current condition in the said circuit and to thus mechanically disconnect the contact member from the actuating member and permit the said contact member to automatically move to its open-circuit position independently of the actuating member.

12. An automatic circuit breaker as set forth in claim 11, wherein the thermostatic bi-metallic latch is so related to the actuating and contact members that it acts by tension to move the contact member to closed-circuit position and to normally hold it in such position.

13. An automatic circuit breaker comprising in combination, a movable actuating member, a movable contact member biased toward its open-circuit position, two contacts on the contact member, two stationary contacts with which the movable contacts are normally engaged, and a bi-metallic strip serving in and of itself as a releasable latch normally movable with the actuating and contact members and normally operative for mechanically connecting them to enable the former to effect the movement of the latter to bring the movable contacts out of or into engagement with the respective stationary contacts and thereby open or close the circuit at two separate places, the said bi-metallic strip being carried by the contact member so as to be movable therewith independently of the actuating member and being electrically connected in the circuit between the two movable contacts so as to be automatically deflected upon the passage of excess current therethrough to mechanically disconnect the contact member from the actuating member and thus permit the said contact member to automatically move to its open-circuit position independently of the actuating member.

14. An automatic circuit breaker as set forth in claim 13, wherein the thermostatic bi-metallic strip is U-shaped and wherein the end portions of the strip are detachably held in electrical connection with the respective movable contacts.

15. An automatic circuit breaker as set forth in claim 13, wherein the thermostatic bi-metallic strip is U-shaped and wherein there are provided devices accessible from the front of the circuit breaker and serving to detachably hold the end portions of the strip in electrical connection with the respective movable contacts.

16. An automatic circuit breaker comprising in combination, a movable actuating member, a movable contact member, a spring operatively interposed between the actuating member and the contact member and tending to move the latter relatively to the former toward its open-circuit position, and movable means providing a normally operative releasable mechanical connection between the actuating member and the contact member enabling the former to effect the movement of the latter to open or close the circuit, the said connection means including an electro-responsive device normally movable with the said actuating and contact members and electrically connected in the circuit so as to automatically serve upon the passage of excess current to release the contact member from the actuating member and thus permit the said contact member to automatically move under the action of the spring to its open-circuit position independently of the actuating member.

17. An automatic circuit breaker as set forth in claim 16, wherein the contact member and the spring are both carried by the actuating member.

18. An automatic circuit breaker comprising in combination, two stationary electrical contacts spaced apart, a contact member of insulating material rectilinearly movable between the stationary contacts and biased for movement in the circuit opening position, two movable contacts on the contact member in electrical connection with each other and adapted to be engaged with and disengaged from the respective stationary contacts when the contact member is rectilinearly moved, a manually operable actuating member, and a bodily movable electro-responsively releasable mechanical connection between the actuating member and the contact member enabling the former to effect the rectilinear movement of the latter to open or close the circuit, the said mechanical connection being automatically released upon the passage of excess current to release the contact member from the actuating member and thus permit the said contact member to automatically move rectilinearly to its open circuit position independently of the actuating member.

19. An automatic circuit breaker comprising in combination, a rectilinearly movable actuating member, a contact member rectilinearly movable longitudinally of the actuating member and biased toward its open-circuit position, and movable means providing a normally operative releasable mechanical connection between the actuating member and the contact member enabling the former to effect the rectilinear movement of the latter to open or close the circuit, the said connection means including an electro-responsive device normally movable with the said actuating and contact members and electrically connected in the circuit so as to automatically serve upon the passage of excess current to release the contact member from the actuating member and thus permit the said contact member to automatically move rectilinearly to its open-circuit position independently of the actuating member.

20. An automatic circuit breaker comprising in combination, a rectilinearly movable actuating member, a contact member rectilinearly movable longitudinally of the actuating member and biased toward its open-circuit position, and an electro-thermally affected element serving in and of itself as a releasable latch normally movable with the actuating and contact members and normally operative for mechanically connecting them to enable the former to effect the rectilinear movement of the latter to open or close the circuit, the said electro-thermally affected element being connected in the circuit so as to be automatically actuated upon the passage of excess current to mechanically disconnect the contact member from the actuating member and thus permit the said contact member to automatically move rectilinearly to its open-circuit position independently of the actuating member.

21. An automatic circuit breaker comprising in combination, a fixed electric contact, an actuating member manually movable rectilinearly, a contact member movable longitudinally of the actuating member and having an electric contact movable into or out of engagement with the fixed contact, a spring operatively interposed between the actuating member and the contact member and tending to move the latter relatively to the former so as to bring the movable contact out of engagement with the fixed contact, and means including an electro-responsive device normally movable with the actuating member and normally serving to prevent the said relative movement of the movable contact member by the spring, the said electro-responsive device being electrically connectible with the contacts and serving upon the passage of excess current to release the contact member and thereby permit the said relative movement thereof by the spring.

22. An automatic circuit breaker comprising in combination, two fixed electric contacts, an actuating member manually movable rectilinearly, a contact member provided with two electric contacts and movable longitudinally of the actuating member to bring the contacts into or out of engagement with the respective fixed contacts, a spring operatively interposed between the actuating member and the contact member and tending to relatively move the contact member in the direction of disengagement, and an electro-responsive thermal strip mounted on the contact member and electrically connected between the contacts thereof, the said strip normally serving as a latch to engage the actuating member and prevent the said relative movement of the contact member by the spring and serving upon the passage of excess current to release the movable contact member and thereby permit the said relative movement thereof by the spring.

23. An automatic circuit breaker comprising in combination, a body having a central opening, fixed electric contacts on the body at opposite sides of the opening, an actuating member manually movable rectilinearly through the body opening, a yoke carried by the body and engaging the actuating member to guide it, a contact member provided with two electric contacts and movable through the body opening longitudinally of the actuating member to bring the contacts into or out of engagement with the respective fixed contacts, a coil spring carried by and surrounding the actuating member and tending to move the contact member in the outward direction to effect disengagement of the contacts, and an electro-responsive thermal strip mounted on the contact member and electrically connected between the contacts thereof, the said strip normally serving as a latch to engage the actuating member and prevent the said relative movement of the contact member by the spring and serving upon the passage of excess current to release the movable contact member and thereby permit the said relative movement thereof by the spring.

24. An automatic circuit breaker comprising in combination, a movable actuating member, a movable contact member biased relatively to the actuating member for movement toward its open-circuit position, movable means providing a normally operative releasable mechanical connection between the actuating member and the contact member enabling the former to effect the movement of the latter to open or close the circuit, the said connection means including an electro-responsive device normally movable with the said actuating and contact members and electrically connected in the circuit so as to automatically serve upon the passage of excess current to release the contact member from the actuating member and thus permit the said contact member to automatically move to its open-circuit position independently of the actuating member, a pair of toggle links serving in one position to hold the actuating member in its closed-circuit position, and a spring means serving when the toggle links are moved from their said holding position to automatically move both the actuating member and the contact member to their open-circuit positions.

25. An automatic circuit breaker comprising in combination, a fixed electric contact, an actuating member manually movable rectilinearly, a contact member movable longitudinally of the actuating member and having an electric contact movable into or out of engagement with the fixed contact, a spring tending to move the contact member relatively to the actuating member to bring the movable contact out of engagement with the fixed contact, means including an electro-responsive device bodily movable with the contact member and normally serving to prevent the said relative movement of the contact member by the spring, the said electro-responsive device being electrically connectible with the contacts and serving upon the passage of excess current to release the movable contact member and thereby permit the said relative movement thereof, and spring pressed toggle links having their inner ends connected with the actuating member, the said toggle links when in one position tending to hold the actuating member and associated parts in their inner positions and when in another position tending to hold the actuating member and associated parts in their outer positions.

26. An automatic circuit breaker comprising in combination, a body having a central opening, fixed electric contacts on the body at opposite sides of the opening, an actuating member manually movable rectilinearly through the body opening, a contact member provided with two electric contacts and movable through the body opening longitudinally of the actuating member to bring the movable contacts into or out of engagement with the respective fixed contacts, a spring tending to move the contact member relatively to the actuating member to effect disengagement of the contacts, means including an electro-responsive device bodily movable with the contact member and normally serving to prevent the said relative movement of the contact member by the spring, the said electro-responsive device being electrically connectible with the contacts of the movable contact member and serving upon the passage of excess current to release the movable contact member and thereby permit the said relative movement thereof, toggle links having their inner ends connected with the actuating member, and leaf springs carried by the body and engaging the outer ends of the toggle links, the said springs causing the toggle links when in one position to hold the actuating member and associated parts in their inner positions and causing the toggle links when in another position to hold the actuating member and associated parts in their outer positions.

27. An automatic circuit breaker comprising in combination, a movable actuating member, a movable contact member biased toward its open-circuit position, movable means providing a normally operative releasable mechanical connection between the actuating member and the contact member enabling the former to effect the movement of the latter to open or close the circuit, the said connection means including an electro-responsive device normally movable with the said actuating and contact members and electrically connected in the circuit so as to automatically serve upon the passage of excess current to release the contact member from the actuating member and thus permit the said contact member to automatically move to its open-circuit position independently of the actuating member, and a second electro-responsive device connected in the circuit and held against bodily movement with the said actuating and contact members, the second said electro-responsive device being positioned to act upon a portion of the normally operative releasable mechanical connection and serving upon the passage of excess current to relatively move the said connection and thereby release the contact member from the actuating member to permit it to automatically move as aforesaid.

28. An automatic circuit breaker comprising in combination, a fixed electric contact, a movable contact member having an electric contact thereon, a manually movable actuating member for moving the contact member to bring the movable contact into or out of engagement with the fixed contact, a spring tending to move the contact member relatively to the actuating member so as to bring the movable contact out of engagement with the fixed contact, an electro-responsive thermal strip normally movable with the actuating member and normally serving as a latch to prevent the said relative movement of the movable contact member by the spring, the said strip serving upon the passage of excess current to release the contact member and thereby permit the said relative movement thereof by the spring, and magnetically controlled means acting upon the said strip to move it and thereby release the movable contact member upon the passage of excess current.

29. An automatic circuit breaker comprising in combination, a fixed electric contact, a movable contact member having an electric contact thereon, a manually movable actuating member for moving the contact member to bring the movable contact into or out of engagement with the fixed contact, a spring operatively connected between the actuating member and the contact member and tending to move the latter relatively to the former so as to bring the movable contact out of engagement with the fixed contact, an electro-responsive thermal strip normally movable with the actuating member and normally serving as a latch to prevent the said relative movement of the movable contact member by the spring and serving upon the passage of excess current to release the contact member and thereby permit the said relative movement thereof by the spring, and magnetically controlled means engaging the said strip to mechanically move it and thereby release the movable contact member upon the passage of excess current.

30. An automatic circuit breaker mechanism comprising in combination, two units detachably connected with each other, one unit comprising a movable actuating member and a movable contact member biased toward its open-circuit position, together with movable means providing a normally operative releasable mechanical connection between the actuating member and the contact member enabling the former to effect the movement of the latter to open or close the circuit, which connection means includes an electro-responsive device normally movable with the said actuating and contact members and electrically connected in the circuit so as to automatically serve upon the passage of excess current to release the contact member from the actuating member and thus permit the said contact member to automatically move to its open-circuit position independently of the actuating member, and the other unit comprising a magnetically controlled trip means so positioned, when the units are connected, as to engage the releasable mechanical connection of the first unit and thereby release the movable contact member upon the passage of excess current through the trip means.

31. An automatic circuit breaker unit comprising a movable actuating member, a movable contact member biased toward its open-circuit position, and movable means providing a normally operative releasable mechanical connection between the actuating member and the contact member enabling the former to effect the movement of the latter to open or close the circuit, the said connection means including an electro-responsive device normally movable with the said actuating and contact members and electrically connected in the circuit so as to automatically serve upon the passage of excess current to release the contact member from the actuating member and thus permit the said contact member to automatically move to its open-circuit position independently of the actuating member, in combination with a base on which the circuit breaker unit is detachably mounted, and a magnetically controlled trip means on the base so positioned with respect to the releasable mechanical connection of the circuit breaker unit that the said means can engage the said connection to release the movable contact member upon the passage of excess current through the trip means.

32. The combination of a base, a magnetically controlled trip means on the base, and an automatic circuit breaker unit detachably mounted on the base and comprising a fixed electric contact, a movable contact member having an electric contact thereon, a manually movable actuating member for moving the contact member to bring the movable contact into or out of engagement with the fixed contact, a spring tending to move the contact member relatively to the actuating member to bring the movable contact out of engagement with the fixed contact, an electro-responsive thermal strip normally movable with the actuating member and normally serving as a latch to prevent the said relative movement of the movable contact member by the spring and serving upon the passage of excess current to release the contact member and thereby permit the said relative movement thereof by the spring, the said unit being so positioned with relation to the trip means that the latter can engage the bi-metallic strip of the former to mechanically move it and thereby release the movable contact member upon the passage of excess current through the trip means.

33. In an automatic circuit breaker, the combination of a stationary contact, a movable contact member having a contact adapted to engage and disengage the stationary contact, the said contact member being biased for movement toward its open-circuit position and being normally mechanically held against such movement, and a thermostatic bi-metallic strip supported upon and bodily movable with the contact member and connected in the circuit to be heated upon the attainment of an abnormal current condition therein and thus deflected so as to mechanically release the contact member and permit it to automatically move to open-circuit position.

34. In an automatic circuit breaker, the combination of a stationary contact, a movable contact member biased toward its open-circuit position and having a contact adapted to engage and disengage the stationary contact, and a thermostatic bi-metallic U-shaped strip supported upon and bodily movable with the contact member and serving in and of itself as a releasable latch for normally preventing movement of the contact member to its open-circuit position, the said strip being connected in the circuit to be heated upon the attainment of an abnormal current condition therein and thus deflected so as to release itself and permit the said contact member to automatically move to open-circuit position.

35. In an automatic circuit breaker, the combination of two stationary contacts, a movable contact member having two contacts in electrical connection with each other and adapted to simultaneously engage and disengage the respective stationary contacts, the said contact member being biased for movement toward its open-circuit position and being normally mechanically held against such movement, and a thermostatic bi-metallic strip bodily movable with the contact member and arranged to be heated upon the attainment of an abnormal current condition in the circuit and to be thus deflected so as to mechanically release the contact member and permit it to automatically move to open-circuit position.

36. In an automatic circuit breaker, the combination of two stationary contacts, a movable contact member having two contacts adapted to simultaneously engage and disengage the respective stationary contacts, the said contact member being biased for movement toward its open-circuit position and being normally mechanically held against such movement, and a thermostatic bi-metallic U-shaped strip bodily movable with the contact member and electrically connected between the two movable contacts with the result that upon the attainment of an abnormal current condition in the said strip it is deflected so as to mechanically release the contact member and permit it to automatically move to open-circuit position.

37. In an automatic circuit breaker, the combination of two stationary contacts, a movable contact member biased toward its open-circuit position and having two contacts adapted to simultaneously engage and disengage the respective stationary contacts, and a thermostatic bi-metallic strip supported upon and bodily movable with the contact member and serving in and of itself as a releasable latch for normally preventing movement of the contact member to its open-circuit position, the said strip being electrically connected between the two movable contacts with the result that upon the attainment of an abnormal current condition in the said strip it is deflected so as to release itself and permit the said contact member to automatically move to open-circuit position.

38. In an automatic circuit breaker, the combination of a stationary contact, a movable contact member biased toward its open-circuit position and having a contact adapted to engage and disengage the stationary contact, a movable actuating member normally adapted to move the contact member to open or to close the circuit, and a thermally differentially expansive bi-metallic strip normally movable with the actuating and contact members and connected in the circuit so that upon the attainment of an abnormal current condition in the strip it is deflected from its normal relationship to the aforesaid members, the said movable bi-metallic strip serving upon such deflection to mechanically disconnect the contact member from the actuating member and thus permit the said contact member to automatically move independently to its open-circuit position.

39. In an automatic circuit breaker, the combination of two stationary contacts, a movable contact member biased toward its open-circuit position and having two contacts adapted to simultaneously engage and disengage the respective stationary contacts, a movable actuating member normally adapted to move the contact member to open or close the circuit, and a thermostatic bi-metallic strip normally movable with the actuating and contact members and electrically connected between the two movable contacts so that upon the attainment of an abnormal current condition in the circuit it is deflected from its normal relationship to the aforesaid members, the said movable bi-metallic strip serving upon such deflection to mechanically disconnect the contact member from the actuating member and thus permit the said contact member to automatically move independently to its open-circuit position.

40. An automatic circuit breaker comprising in combination, two stationary contacts, a rectilinearly movable contact member having two contacts adapted to simultaneously engage and disengage the respective stationary contact, the said contact member being biased for rectilinear movement toward its open-circuit position and being normally mechanically held against such movement, and a thermostatic bi-metallic strip supported upon and bodily movable with the contact member and arranged to be heated upon the attainment of an abnormal current condition in the circuit and thus deflected so as to mechanically release the contact member and permit it to automatically move rectilinearly to open-circuit position.

41. An automatic circuit breaker comprising in combination, two stationary contacts, a rectilinearly movable contact member biased toward its open-circuit position and having two contacts adapted to simultaneously engage and disengage the respective stationary contacts, and a thermostatic bi-metallic U-shaped strip supported upon and bodily movable with the contact member and serving in and of itself as a releasable latch for normally preventing rectilinear movement of the contact member to its open-circuit position, the said U-shaped strip being electrically connected between the movable contacts so as to be deflected upon the attainment of an abnormal current condition and so as to thus release itself and permit the contact member to automatically move rectilinearly to open-circuit position.

42. The combination in an automatic circuit breaker, of a stationary contact, a movable insulating contact member having a movable contact adapted to engage and disengage the stationary contact, the said contact member being biased for movement in the circuit-opening direction and being normally held mechanically against such movement, and a thermally responsive element bodily movable with the insulating contact member and arranged to be heated upon the attainment of an abnormal current condition in the circuit so as to mechanically release the contact member and permit it with its movable contact to automatically move to open-circuit position, the said thermally responsive element being closely adjacent the rupturing position of the contacts and being shielded therefrom by portions of the insulating contact member.

43. The combination in an automatic circuit breaker, of a stationary contact, a movable insulating contact member biased in the circuit-opening direction and having a movable contact adapted to engage and disengage the stationary contacts, and a thermostatic bi-metallic strip bodily movable with the insulating contact member and shielded by portions thereof from the rupturing position of the contacts, the said strip serving in and of itself as a releasable latch for normally preventing circuit-opening movement of the contact member and the said strip being electrically connected in the circuit so as to be deflected upon the attainment of an abnormal current condition and so as to thus release itself and permit the said contact member to automatically move to open-circuit position.

44. The combination in an automatic circuit breaker, of a stationary contact, a movable insulating contact member biased in the circuit-opening direction and having a movable contact adapted to engage and disengage the stationary contact, a movable actuating member, and a thermostatic bi-metallic strip bodily movable with the insulating contact member and shielded by portions thereof from the rupturing position of the contacts, the said strip serving in and of itself as a releasable latch for normally mechanically connecting the contact member with the actuating member and the said strip being electrically connected in the circuit so as to be deflected upon the attainment of an abnormal current condition and so as to thus release itself and permit the said contact member to automatically move independently to open-circuit position.

45. The combination in an automatic circuit breaker, of a stationary contact, a movable insulating contact member biased in the circuit-opening direction and having a central opening therein, the said member having a movable contact adapted to engage and disengage the stationary contacts, a movable actuating member extending into the central opening in the contact member, and a bodily movable thermostatic bi-metallic strip serving in and of itself as a releasable latch for normally mechanically connecting the contact member with the actuating member and being electrically connected in the circuit so as to be deflected upon the attainment of an abnormal current condition and so as to thus release itself and permit the said contact member to automatically move independently to open-circuit position, the said strip being positioned in part in the central opening in the insulating contact member and being thus shielded by portions of the said member from the rupturing position of the contacts.

46. The combination in an automatic circuit breaker, of two stationary contacts, a movable insulating contact member biased in the circuit-opening direction and having a central opening therein, the said member having two movable contacts adapted to engage and disengage the respective stationary contacts, a movable actuating member extending into the central opening in the contact member, and a bodily movable thermostatic bi-metallic strip serving in and of itself as a releasable latch for normally mechanically connecting the contact member with the actuating member and being electrically connected between the two movable contacts so as to be deflected upon the attainment of an abnormal current condition and so as to thus release itself and permit the said contact member to automatically move independently to open-circuit position, the said strip being positioned in part in the central opening in the insulating contact member and being thus shielded by portions of the said member from the rupturing positions of the contacts.

47. The combination in an automatic circuit breaker, of a stationary contact, a movable contact adapted to engage and disengage the stationary contact, the last said contact being biased for movement in the circuit-opening direction and being normally held mechanically against such movement, a thermally responsive element bodily movable with the movable contact and arranged to be heated upon the attainment of an abnormal current condition in the circuit so as to mechanically release the said movable contact and thus permit it to automatically move to open-circuit position, and a pair of insulating walls associated with the contacts and arranged at opposite sides of and closely adjacent the path of movement of the movable contact.

48. The combination in an automatic circuit breaker, of two stationary contacts, two movable electrically connected contacts adapted to engage and disengage the respective stationary contacts, the last said contacts being biased for movement in the circuit-opening direction and being normally held mechanically against such movement, a thermally responsive element bodily movable with the movable contacts and connected in the circuit between them and serving upon the attainment of an abnormal current condition to mechanically release the said contacts and thus permit them to automatically move to open-circuit position, and two pairs of insulating walls associated with the respective pairs of contacts and arranged with the walls of each pair at opposite sides of and closely adjacent the path of circuit-opening movement of the corresponding movable contact.

49. The combination in an automatic circuit breaker, of two stationary contacts, an insulating contact member movable between the stationary contacts and having two movable electrically connected contacts adapted to engage and disengage the respective stationary contacts, the said contact member being biased for movement in the circuit-opening direction and being normally held mechanically against such movement, a thermally responsive element bodily movable with the contact member and arranged to be heated upon the attainment of an abnormal current condition in the circuit so as to mechanically release the contact member and thus permit it to automatically move to open-circuit position, and two insulating walls immediately adjacent the paths of circuit-opening movement of the contact member and of the respective movable contacts.

50. The combination in an automatic circuit breaker, of two transversely spaced stationary contacts, an insulating contact member movable between the stationary contacts and having a central opening, said member having two transversely spaced movable contacts adapted to engage and disengage the respective stationary contacts and being biased in the circuit-opening direction, a movable actuating member extending into the central opening in the contact member, and a thermostatic bi-metallic strip bodily movable with the insulating contact member and positioned in part in the central opening therein, the said strip serving in and of itself as a releasable latch normally mechanically connecting the contact member with the actuating member and the said strip being electrically connected between the two movable contacts so as to be deflected upon the attainment of an abnormal current condition and so as to thus release itself and permit the said contact member to automatically move independently to open-circuit position, and two insulating walls immediately adjacent the paths of circuit-opening movement of the contact member and of the respective movable contacts.

51. In an automatic circuit breaker, the combination of a movable contact member biased toward its open-circuit position, a movable actuating member normally adapted to move the contact member to open or close the circuit, an electro-responsive means normally movable with the actuating and contact members and serving upon the attainment of an abnormal current condition in the circuit to release the connection between the contact member and the actuating member and to thus permit the said contact member to automatically move independently to its open-circuit position, and a second electro-responsive means connected in the circuit and fixed against bodily movement with the actuating and contact members and serving upon the attainment of an abnormal current condition in the circuit to cause the contact member to move to its open-circuit position.

52. In an automatic circuit breaker, the combination of a movable contact member biased toward its open-circuit position, a movable actuating member normally adapted to move the contact member to open or close the circuit, a thermally affected element normally movable with the actuating and contact members and serving upon heating actuation to release the connection between the contact member and the actuating member and to thus permit the said contact member to automatically move independently to its open-circuit position, and electromagnetic means connected in the circuit and fixed against bodily movement with the actuating and contact members and serving upon the attainment of an abnormal current condition in the circuit to cause the contact member to move to its open-circuit position.

53. A circuit breaker comprising a pair of fixed contacts, a pair of movable contacts for engaging the fixed contacts, a movable bar for supporting the contacts and for permitting relative movement of the movable contacts with respect thereto, means for moving the movable contacts to open position independently of movement of the bar, and current-responsive means for releasably retaining the movable contacts in operative engagement with the fixed contacts.

54. A circuit breaker comprising a pair of fixed contacts, a pair of movable contacts for engaging the fixed contacts, a movable bar for supporting the contacts and for permitting relative movement of the movable contacts with respect thereto, means for moving the movable contacts to open position independently of movement of the bar, current-responsive means for releasably retaining the movable contact in operative engagement with the fixed contacts, and means for resetting the movable contacts.

55. In a circuit interrupter, a pair of stationary contacts, movable means of insulating material, a pair of movable contacts carried by said means of insulating material and being movable therewith upon movement of said means of insulating material to normally open and close the circuit through the circuit interrupter, actuating means movable to cause movement of said means of insulating material to normally open and close the circuit, spring means biasing said movable contacts toward open-circuit position while in closed-circuit position, and electro-responsive means forming a disengageable mechanical connection between said movable contacts and said actuating means to permit said movable contacts to move to open the circuit without any movement of said actuating means, said electro-responsive means being movable with both said movable contacts and said actuating means upon movement thereof to normally open and close the circuit and including a U-shaped conducting member having inherent electro-responsive characteristics, said U-shaped conducting member having each side thereof electrically connected to one of said movable contacts and having its closed end movable to cause opening of the circuit upon the occurrence of abnormal current conditions.

56. In a circuit interrupter, a pair of stationary contacts, movable means of insulating material, a pair of movable contacts carried by said means of insulating material and being movable therewith upon movement of said means of insulating material to normally open and close the circuit through the circuit interrupter, actuating means movable to cause movement of said means of insulating material to normally open and close the circuit, spring means biasing said movable contacts toward open-circuit position while in closed-circuit position, and electro-responsive means forming a disengageable mechanical connection between said movable contacts and said actuating means to permit said movable contacts to move to open the circuit without any movement of said actuating means, said electro-responsive means being movable with both said movable contacts and said actuating means upon movement thereof to normally open and close the circuit and including a U-shaped conducting member having inherent electro-responsive characteristics, said U-shaped conducting member having each side thereof electrically connected to one of said movable contacts and having its closed end movable to cause opening of the circuit upon the occurrence of abnormal current conditions irrespective of the position in which said actuating means may be held and said means of insulating material being movable by said actuating means to cause normal opening of the circuit without disengagement of said mechanical connection.

JOSEPH SACHS.